United States Patent [19]
Dimmer

[11] 3,965,307
[45] June 22, 1976

[54] ELECTRONIC TONE RINGER
[75] Inventor: Robert P. Dimmer, Lombard, Ill.
[73] Assignee: GTE Automatic Electric Laboratories Incorporated, Northlake, Ill.
[22] Filed: May 28, 1974
[21] Appl. No.: 473,852

[52] U.S. Cl. .............................................. 179/84 T
[51] Int. Cl.² ......................................... H04M 1/00
[58] Field of Search ............ 179/84 T, 84 R, 84 VF, 179/17 A, 18 FH, 27 DB, 27 E, 28

[56] References Cited
UNITED STATES PATENTS

| | | | |
|---|---|---|---|
| 3,165,591 | 1/1965 | Flowers | 179/84 T |
| 3,218,395 | 11/1965 | Suda | 179/84 T |
| 3,609,579 | 9/1971 | Chappell | 331/46 |
| 3,808,379 | 4/1974 | Lind | 179/84 T |
| 3,867,585 | 2/1975 | Morstadt | 179/84 T |

Primary Examiner—Kathleen H. Claffy
Assistant Examiner—Joseph Popek
Attorney, Agent, or Firm—Robert J. Black

[57] ABSTRACT

An electronic tone ringer for use in telephone subsets. Operating in response to and powered from incoming received ringing signals, the ringer circuitry provides audible multitone signals. The circuitry employed eliminates so-called "bell tapping" or "chirping" during dialing.

5 Claims, 2 Drawing Figures

ELECTRONIC TONE RINGER

BACKGROUND OF THE INVENTION

1. Field of the Invention

This invention relates to telephone systems and more particularly to a tone ringer for use in a telephone subscriber's subset.

2. Description of the Prior Art

In the past most telephone subset ringers have been of the electromechanical type. These units typically consist of an electromagnet that operates in response to ringing signals received from the telephone central office. In response to these signals a clapper or hammer type of mechanism is caused to periodically make contact with and then release, against a bell or gong type of mechanism. The resulting sound being transmitted to the subscriber to act as a signal that an incoming call is being received. Such electromechanical units are characterized by substantially large size and consequently are difficult to include in present day telephone subsets, which are substantially reduced in size over earlier versions.

Like most mechanical devices electromechanical ringers in continued operation are highly prone to changes in adjustment. Such changes frequently cause changes in tone, volume, etc. rendering the output signal unacceptable to the telephone subscriber. To correct such adjustments service calls are required with the obvious economic disadvantage. Also the output signals of electromechanical ringers are frequently mistaken for similar devices such as doorbells, etc. that are often located in an environment similar to that where a conventional telephone substation is employed.

The characteristic sounds produced by electromechanical ringers contain many high frequency components. Older subscribers may traditionally have a loss of hearing particularly at high frequencies and accordingly they experience considerable difficulty in hearing conventional electromechanical ringers.

More recently ringers of electronic construction have been developed. Some of these units have generated single frequency tone signals which have found a general lack of acceptance in public usage. In attempts to correct this fault in early electronic tone ringers various techniques have been developed for providing multitone signals. An early approach to the problem was to modulate the tone source with the incoming ringing signals, providing a composite signal whose characteristics were determined by a base frequency modulated by the frequency of the alternating current ringing signal received from the central office. Such signals were also found to be essentially unacceptable by telephone subscribers because the ringing frequencies utilized by telephone companies are many and varied. Some of the resultant output signals are not easily recognized as being indicative of incoming telephone calls. Accordingly subscriber acceptance was also poor.

Prior art electronic ringers have also suffered from other problems such as changes in characteristics due to the subscriber's line loop length and the use of multiple ringers on the same telephone line.

Early electronic tone ringers generally proved to be insufficient in output providing less than adequate signal strength. Several different techniques have been employed to correct this obvious defect, including the use of horns, resonators, etc., to acoustically improve the output signal of the tone ringer.

Many prior art electronic tone ringers also suffered from an inability to distinguish from spurious line signals and ringing signals, accordingly producing false tones that were not actually indicative of an incoming call.

An electronic tone ringer that eliminated most of the prior art problems, was disclosed in U.S. Pat. application, Ser. No. 385,134 filed Aug. 2, 1973 by Richard A. Morstadt. While essentially satisfactory in operation the Morstadt design under certain conditions was subject to so called "bell topping" or "chirping", a condition which causes the ringer to momentarily operate during dialing. Accordingly the present invention discloses an electronic tone ringer which may be considered as an improvement over the Morstadt design in that it provides all the features included in the Morstadt design and yet eliminates so called "bell tapping" or "chirping". The above referenced ringer was also of the straight line type and unable to function satisfactorily on a divided party line because of resulting heavy ground currents with possible unbalance and noise. Accordingly it is a further object of the present invention to provide an electronic tone ringer that is adaptable for two party divided ringing.

SUMMARY OF THE INVENTION

The electronic telephone ringer of the present invention is powered from ringing signals received over the telephone line from a telephone central office. At the subscriber station the incoming ringing signals are coupled through a capacitor to a full-wave bridge rectifier connected across the telephone line. The output of the bridge rectifier is filtered to eliminate excessive ripple by means of a capacitor and then applied to an input of a transistorized series regulator circuit which employs a zener diode as a reference to produce a known and constant voltage output. This output signal is then utilized to power portions of the associated circuitry of the present telephone ringer. Certain other portions of the present ringer however utilize the unregulated voltage directly from the ripple filter.

The output signals from the power supply are dependent on interrupted ringing signals received from a telephone office and may be considered as successive but distinct and separate burst of direct current.

Included in the present tone ringer are a transistorized audio oscillator of the R/C type that normally generates a tone signal output as a first frequency. Included however in its frequency determining component structure is a resistor that may be shunted in response to the output of a second oscillator. This combination of two oscillators causes the output of the first oscillator to shift back and forth between two different and distinct audio tones, at a rate determined by the output of the second oscillator. The resultant output signal from the two oscillators in combination is applied to a power amplifier stage whose output is connected to a small dynamic or electromagnetic transducer.

Also included in the present circuitry is a threshold detector circuit which operates after the output of the power supply reaches a predetermined voltage to permit the signals generated by the two oscillators to be applied to as power amplifier output stage.

In the previously referenced application the tone ringer employed a bridged rectifier to furnish operating power as well as a source for providing the ring sense or turn on voltage. A bridge rectifier cannot sense direction as a consequence either ringing voltage or dial transients will turn on the ringer. It was found that the transient from the positive side of the line was considerably lower than that obtained from the negative side and that it was best to connect the input DC isolation capacitor of the ringer in the negative side of the line. By removing the ring sense circuitry from the bridge rectifier output to its own half-wave recitifer, it is possible to block the dial transient voltage and yet turn on the ringer by the ringing voltage. When this half-wave rectifier is connected to the positive side of the line, the dial transient is too small to turn the ringer on.

To provide two party divide ringing, a similar ring sense circuit or threshold detector, is employed but with the addition of a circuit to sense the line side on which ringing is occurring. If the ring sense circuits are poled correctly the "party one" ringer will operate and the "party two" ringer will not operate. When the central office equipment reverses the ringing generator, the "party two" ringer will operate and the "party one" ringer will not operate.

DESCRIPTION OF THE PREFERRED EMBODIMENTS

Figure 1:
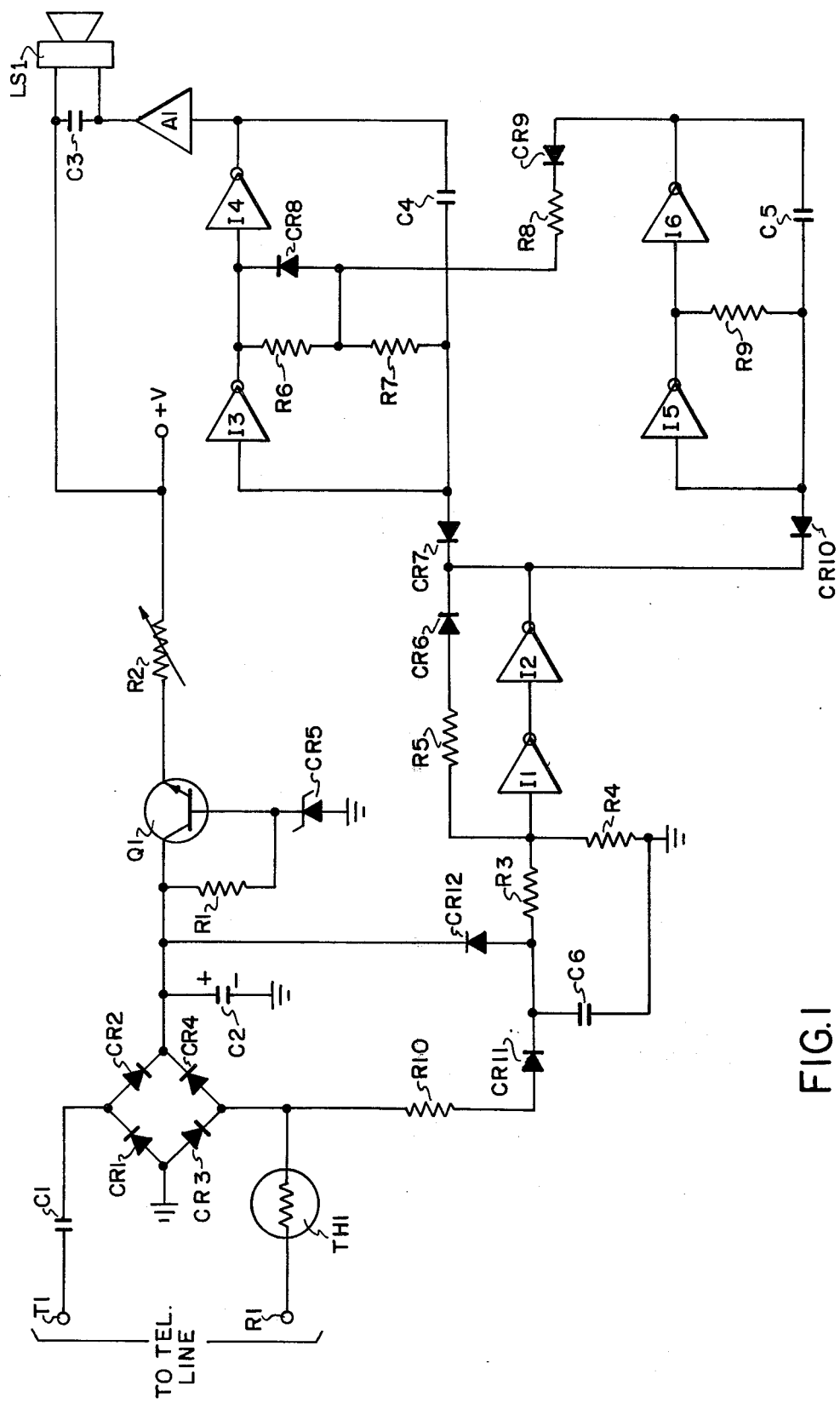
FIG. 1 is a schematic circuit diagram of an electronic tone ringer for use in a telephone subscribers station operated on a straight line basis in accordance with the present invention.

Referring now to FIG. 1 there is shown in schematic form a straight line tone ringer for use in a telephone subscriber substation in accordance with the present invention. The present ringer device is connected to a subscriber telephone line through the subscriber telephone substation which is not shown inasmuch as it does not form a portion of the present invention.

Incoming signals received over the telephone line are presented to terminals T1 and R1 where they are coupled through coupling capacitor C1 and thermistor TH1 to a fullwave rectifier diode bridge consisting of diodes CR1 through CR4 inclusive. Capacitor C1 provides isolation of the present circuitry from any direct current potentials that may exist on the telephone line. Thermistor TH1 isolates the present tone ringer from the transmission circuitry of the associated telephone subset. In this manner normal low level telephone signals such as speech signals, touch calling signals, etc. are not affected by the circuitry of the present tone ringer due to the high impedance presented by thermistor TH1. Positive voltage output is taken from the bridge rectifier at the junction of diodes CR2 and CR4, while negative (circuit ground) is taken from the junction of diodes CR1 and CR3.

Output from the bridge rectifier is connected across capacitor C2 which acts as a filter to eliminate excessive ripple from the output potential derived from the bridge rectifier. Filtered potential is then applied to the collector of transistor Q1 which acts as a series regulator in conjunction with its associated biasing resistor R1 and reference zener diode CR5. The regulated output potential taken from the emitter of transistor Q1 at terminal +V is connected to the various circuit elements of the present tone ringer. The particular connections of battery and ground have not been shown for the sake of clarity inasmuch as they do not actually form a portion of the present invention.

The basic tone signals generated by the present tone ringer are produced by an oscillator circuit consisting of inverters I3 and I4 and their associated frequency determining components R6, R7 and C4. All of the inverter circuits used in the present invention are conventional in design, thus the detailed circuitry is not shown. Also included in this oscillator are diodes CR8, CR9 and resistor R8 whose function will be described in detail later.

Assuming now that power from terminal +V and ground is connected to inverters I3 and I4 and assuming that diode CR7 is non-conductive, the circuitry consisting of inverters I3, I4, etc., will oscillate at a rate determined by the frequency determining components outlined above.

During normal operation of the oscillator that includes inverters I3 and I4 the output of inverter I3 is alternately positive and then ground while the output of inverter I4 is alternately ground and then positive. Assuming the output of I3 is positive and the output of I4 is ground, capacitor C4 will be charged from the positive output of I3 through resistors R6 and R7. When the capacitor is sufficiently charged (the voltage at the input to I3 has reached a predetermined level) the output of I3 will switch to ground and the output of I4 will switch positive. Capacitor C4 will then be charged in the opposite direction from the positive output of I4 through R7 and CR8 to the ground reference presented at the output of I3. When C4 is sufficiently charged (the voltage at the input of I3 has fallen to the predetermined threshold) the inverters will switch to their initial states. It should be noted at this point that the period of time that the output of inverter I4 is positive is a function of the values of R7 and C4 while the period of time that I4 is at ground is a function of the values of R6, R7 and C4. In the present embodiment the frequency of operation of the oscillator consisting of inverters I3, I4, etc. is typically fixed in the range of 400 to 2000 Hz.

The oscillator consisting of inverters I5 and I6 operates in a similar manner except that the time period of both half cycles of operation are determined by the values of R9 and C5. The signal from this oscillator is typically fixed at a frequency in the range from 5 to 40 Hz. The positive voltage portion of this oscillator's signal is taken from the output of inverter I6, coupled through CR9 and R8 and presented to the oscillator consisting of I3 and I4 for the purpose of altering its period of oscillation.

It should be noted that presence of a positive signal at the output of I6 causes a modification of only the half cycle of operation of oscillator I3, I4 that corresponds to a ground level at the output of I4. Under this condition, the time period for this half cycle of operation of oscillator I3, I4 is determined by the values of R6 and R9 in parallel, R7 and C4. There is no modification of the operation of oscillator I3, I4 by oscillator I5, I6 when I3 is at ground (I4 positive) or when I6 is at ground because of the shunting effect of CR8 or the blocking effect of CR9 respectively.

Thus the output signal waveform from the oscillators appears at the output of I4 with fixed positive level time period and a variable ground level time period, altered at the frequency of oscillation of I5, I6. This output signal is amplified by amplifier A1. The output of amplifier A1 is coupled to a miniature loudspeaker or similar transducer for reproducing the tone signals utilized to advise a telephone subscriber of incoming range signals being received at the associated telephone subset.

Capacitor C3 connected across the input of transducer LS1 acts to reduce the amplitude of high frequency signals applied to transducer LS1, and acts in conjunction with the inductance of transducer LS1 to accentuate the desired output signals from the oscillators of the present invention.

Potentiometer R2 permits adjustment by the subscriber of the amplitude of the signals reproduced by transducer LS1.

Referring now again to FIG. 1 connected between the positive output of the rectifier bridge and the two oscillators mentioned above is a threshold detector circuit consisting of inverters I1, I2, resistors R3, R4, R5, R10, diodes CR6, CR7, CR10, CR11 and CR12 and capacitor C6. This threshold detector circuitry acts to inhibit the operation of the two oscillators described previously until such time as the voltage output from the rectifier reaches a predetermined level.

Initially prior to that time in which the voltage from the rectifier reaches the predetermined amplitude, the output of inverter I1 is positive and the output of inverter I2 is at ground. With the ground present at the output of inverter I2 the same ground will act to prevent operation through diode CR7 of the oscillator consisting of inverters I3 and I4, etc., and through diodes CR10 the operation of the oscillator consisting of inverters I5, I6, etc. As ringing current received at terminals T1 and R1 is rectified by the full-wave rectifier consisting of diodes CR1, CR2, CR3, and CR4, the positive cycle of ringing passes through resistor R10 and diode CR11 to charge capacitor C6.

As the voltage from the rectifier rises, the voltage at the input of inverter I1 is determined by a voltage divider consisting of resistors R4 and R5 in parallel and R3. When the input voltage determined by this voltage divider rises to a predetermined value inverter I1 and consequently inverter I2 will change state, with inverter I1 going to ground and the output of inverter I2 going positive. At this time the positive voltage output from inverter I2 reverse biases diodes CR7 and CR10 allowing the previously described oscillators to go into operation, whereupon they generate the previously described tone signals which are amplified by amplifier A1 and reproduced by transducers LS1.

Resistor R10 and R3 provide isolation: diode CR12 causes the voltage across capacitors C2 and C6 to track. On outgoing dialing the dial transients generated cannot charge capacitor C6 sufficiently to turn the ringing oscillator on. This latter ability eliminates "bell tapping" or "chirping".

Bell tapping is an expression used to designate a false triggering of a telephone ringer due to dial pulses, hook switch operation, or any other spurious high voltage transient. When caused by dial pulses it is sometimes referred to as "dial tapping" while where electronic ringers are employed this phenomena is sometimes referred to as "chirping".

As the ring signal ceases and the output of the rectifier diminishes, the voltage at the input of inverter I1, which is now determined solely by a voltage divider consisting of resistors R3 and R4 (resistor R5 is no longer included from that time that inverter I2's output went positive), diminishes below the predetermined threshold and inverters I1 and I2 again change states with the output of inverter I1 returning to positive and the output of inverter I2 returning to ground. Accordingly, with the ground signal present at the output of I2 ground is applied through diodes CR7 and CR10 to the two oscillators in the manner previously described, rendering them inoperative.

Figure 2:
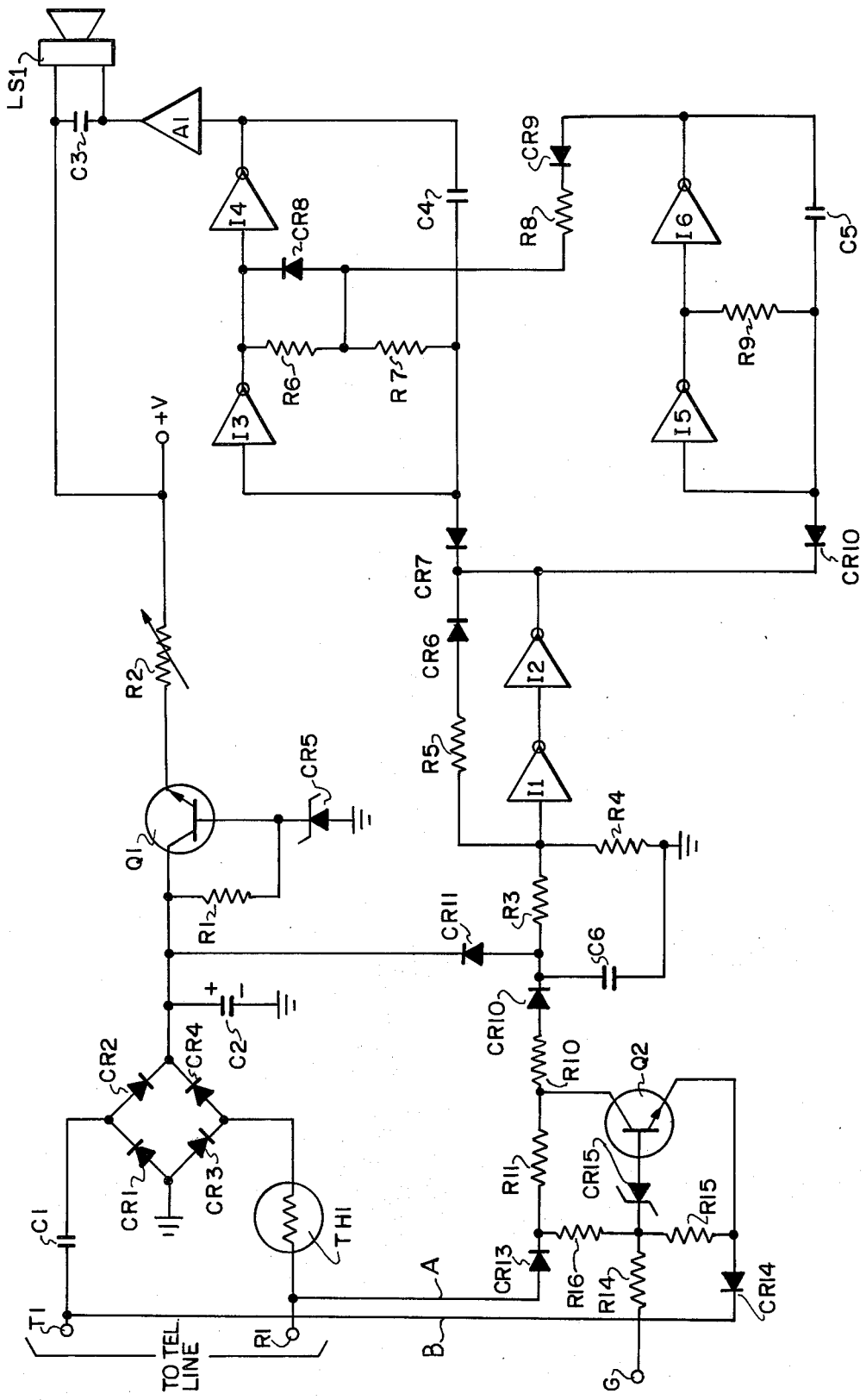
FIG. 2 is a schematic circuit diagram of an electronic tone ringer for use in a telephone subscriber station operated on a two party divided ringing basis in accordance with the present invention.

Referring now to FIG. 2, the circuit for two party divided ring is shown. As may be observed the circuit is similar to that for straight line ringing as shown in FIG. 1 including the same ring sense circuitry as used before except that additional circuitry consisting of resistors, R11, R12, R13, and R14, diodes CR12 and R13, zener diode CR14 and transistor Q2 have been added. These additional components have been added to detect the ringing side of the line. If connector B of the added circuitry is connected to the positive side of the line with connector A to the negative side, and the ground terminal G is connected to a good earth ground at the subscribers premises, the ringing voltage will be rectified via diodes CR13, resistors R10 and R11 and diode CR10 to charge capacitor C6. This will occur on calls where the ringing generator at the telephone central office is connected between the positive side of the line and ground (the negative side of the line at the central office is also connected to ground).

If the subscriber being served by the present ringer is "party two" in a two party ringing scheme, the A and B leads will be reversed thereby connecting connector B to the negative side of the line and connector A to the positive side. When ringing occurs transistor Q2 will turn on when the zener voltage of zener diode CR15 is reached, which effectively limits the ring sense voltage to prevent turn on of the ringer. For ringing party two the ringing generator is reversed at the telephone central office.

In the ringing arrangement shown therefore it is only necessary to reverse the A and B connectors to provide two party service. Reversal of positive and negative terminals will not provide the same effect, because the positive terminal of the ringer must always be connected to the positive side of the line to prevent bell tapping as noted above.

While but two embodiments of the present invention has been shown, it will be obvious to those skilled in the art that numerous modifications may be made without departing from the spirit and scope of the present invention which shall be limited solely by the claims appended hereto.

What is claimed is:

1. A tone ringer for use in a telephone subset connected to a telephone line, comprising: a rectifier circuit connected to said telephone line, operated in response to ringing signals received over said telephone line, to convert said ringing signals to DC potential; a first oscillator circuit including a plurality of frequency determining components operated to generate tone signals at a first frequency; a second oscillator circuit operated to periodically shunt at least one of said plurality of frequency determining components in said first oscillator; a threshold detector including a capacitor charged in response to at least a predetermined value of said DC potential to permit operation of said oscillators, connected between said rectifier and said first and second oscillator; operated in response to said DC potential from said rectifier being less than a predetermined value to inhibit operation of said oscillators and further operated in response to said DC potential from said rectifier being greater than said predetermined value to render said oscillators operated; said first oscillator further operated in response to each shunting of at least one of said frequency determining components, to generate a tone at a second frequency; a transducer connected to said first oscillator operated in response to generation by said first oscillator of tones of said first and second frequencies to audibly reproduce said tones; and party line determining means connected to ground and between said telephone line and said threshold detector whereby said threshold detector is rendered operable only in response to ringing current received over one side of said telephone line.

2. A tone ringer as claimed in claim 1 wherein: said first oscillator includes a circuit connection to said transducer and in response to ringing signals received over said telephone line provides a DC operating potential to said transducer.

3. A tone ringer as claimed in claim 1 wherein: there is further included a regulator circuit connected to said rectifier circuit said regulator operated to maintain the magnitude of said DC potential at a constant level.

4. A tone ringer as claimed in claim 3 wherein: there is further included an amplifier circuit connected between said first oscillator and said transducer, operated to amplify said tones of said first and second frequencies; and said transducer is connected to said regulator, and in response to said constant magnitude DC potential said amplifier and transducer are operated to amplify and reproduce said signals at a constant maximum amplitude.

5. A tone ringer as claimed in claim 1 wherein: said party line detecting means comprise a first circuit connection to a first side of said telephone line; a second connection to a second side of said telephone line; and switching means connected between said circuit connections and ground; said party line detecting means operated to conduct potential from one side of said telephone line directly to said threshold means in response to ringing current being connected between a first side of said telephone line and ground; and further operate to inhibit conduction of a signal in response to said telephone signal being applied between ground and the second side of said telephone line.

* * * * *